United States Patent
Krauska

(10) Patent No.: US 12,494,819 B2
(45) Date of Patent: Dec. 9, 2025

(54) ULTRA-WIDEBAND SIGNAL GENERATOR WITH LOW PHASE NOISE

(71) Applicant: Tektronix, Inc., Beaverton, OR (US)

(72) Inventor: Alexander Krauska, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 41 days.

(21) Appl. No.: 18/483,470

(22) Filed: Oct. 9, 2023

(65) Prior Publication Data

US 2024/0137066 A1  Apr. 25, 2024

Related U.S. Application Data

(60) Provisional application No. 63/415,622, filed on Oct. 12, 2022.

(51) Int. Cl.
H04B 1/71         (2011.01)
H04B 1/7163       (2011.01)

(52) U.S. Cl.
CPC ............... H04B 1/71632 (2013.01)

(58) Field of Classification Search
CPC ............................. H04B 1/71632
USPC .......................... 375/146
See application file for complete search history.

(56) References Cited

U.S. PATENT DOCUMENTS

| | | | | |
|---|---|---|---|---|
| 7,277,679 B1 * | 10/2007 | Barratt | ............ | H04B 17/309 455/135 |
| 2009/0052556 A1 * | 2/2009 | Fernandez | ............ | H03M 1/662 375/240 |
| 2012/0108185 A1 * | 5/2012 | Yen | ............ | H04B 1/0064 455/90.2 |

* cited by examiner

*Primary Examiner* — Kevin M Burd
(74) *Attorney, Agent, or Firm* — Miller Nash LLP; Krista Chan

(57) ABSTRACT

A waveform generator includes a carrier band generator to produce a carrier signal, one or more selectable frequency multipliers to receive the carrier signal and to output a selected carrier signal having a frequency of a multiple of the carrier signal, at least two main digital-to-analog converters (DACs), each main DAC to receive a digital in-phase (I) or quadrature (Q) signals, and to convert the digital I and Q signals to analog I and Q signals in accordance with a control signal, at least two offset DACs, each offset DAC to receive the digital I or Q signals to convert the digital I and Q signals to analog I and Q signals in accordance with the control signal, a mixer to mix the analog I and Q signals with the selected carrier signal to produce an output signal, and a variable filter configured to produce a filtered output signal.

20 Claims, 6 Drawing Sheets

ULTRA-WIDEBAND SIGNAL GENERATOR WITH LOW PHASE NOISE

CROSS-REFERENCE TO RELATED APPLICATIONS

This disclosure claims benefit of U.S. Provisional Application No. 63/415,622, titled "ULTRA-WIDEBAND SIGNAL GENERATOR WITH LOW PHASE NOISE," filed on Oct. 12, 2022, the disclosure of which is incorporated herein by reference in its entirety.

TECHNICAL FIELD

This disclosure relates to test and measurement instruments, and more particularly to a signal generator.

BACKGROUND

Wave and function generators may rely upon more than one oscillator to provide different carrier frequencies for output signals. These become a source of phase noise, where phase noise is the frequency domain representation of random fluctuations of the waveform. It corresponds to deviations from periodicity in the time domain, for example, jitter.

Using fixed oscillators limits the flexibility of test equipment to generate carrier waves. If the equipment uses a tunable oscillator, the resulting signal degradation affects the performance of the equipment.

In addition, imbalances in a mixer and imperfections in the digital-to-analog converters (DAC) may lead to frequency domain artifacts and the IQ constellation, which may be a measurement of the system.

The embodiments here overcome these deficiencies in the current art.

DESCRIPTION

Ultra-wideband signals generally range across a large portion of the radio spectrum from direct current (DC), or 0 Hz to signals in the tens of GHz. Generation of these signals are susceptible to noise and other artifacts. Systems that test equipment using these signals employ ultra-wideband signal generators that strive to produce high quality signals with little noise or defects.

The embodiments here involve an ultra-wideband signal generator that produces multiple bands of frequency ranges with low phase noise. Generally, the embodiments include using one local oscillator (LO) to generate the carrier frequency for the I and Q signals of whatever modulation technique the system uses. In addition, many of the defects that occur in the signals result from the digital-to-analog converters (DAC) that convert the digitally generated I and q signals to analog signals used for transmission.

Figure 1:
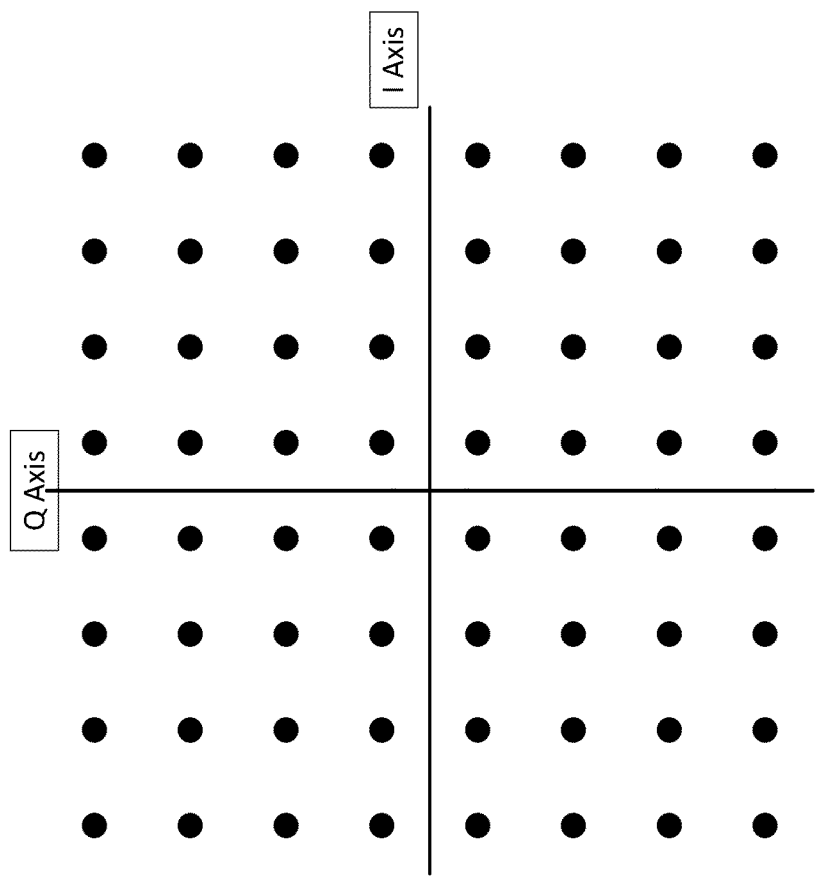

FIGS. 1-5 show graphical representations of I/Q constellations and associated defects. I/Q constellations represent a set of magnitude and phase values on the I/Q plane, to which symbols used in digital modulation schemes are mapped. The digital modulation schemes typically use a discrete number of symbols. FIG. 1 shows an example of an ideal I/Q constellation for a given modulation scheme. The dots represent locations on the constellation where the signals are expected to show up.

Figure 2:
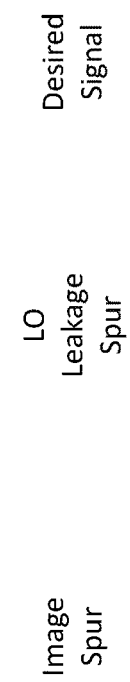
FIGS. 1-5 show constellations of I-Q data and errors in a waveform generator.

As mentioned above, one source of errors or defects lies in the local oscillator (LO) feed through, and image frequency used to generate the carrier frequency. LO feed through, typically resulting from the frequency of the local oscillator being processed by the system, can cause a leakage spur, as shown in FIG. 2. Further, it can cause the image of the frequency of the desired frequency reflected about the LO frequency.

Figure 4:
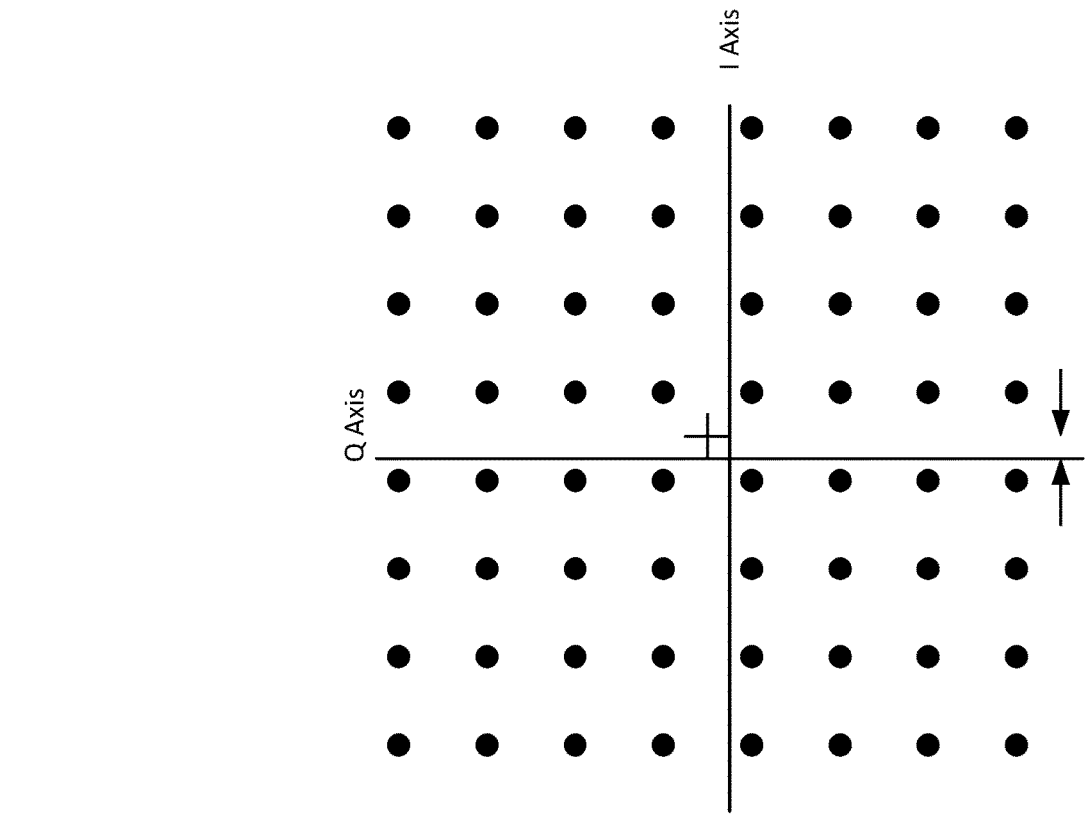
Figure 3:
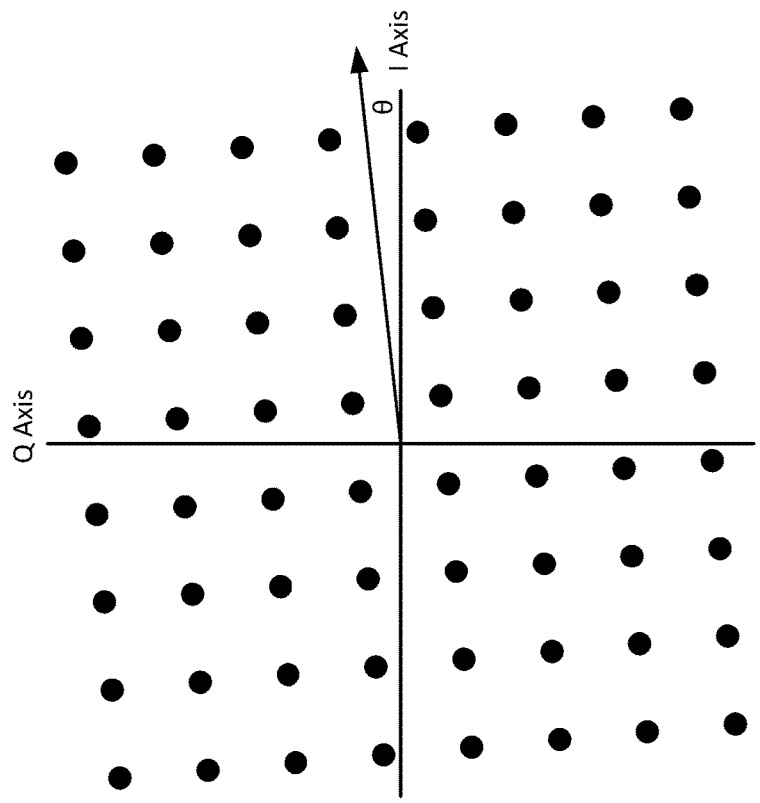
Figure 5:
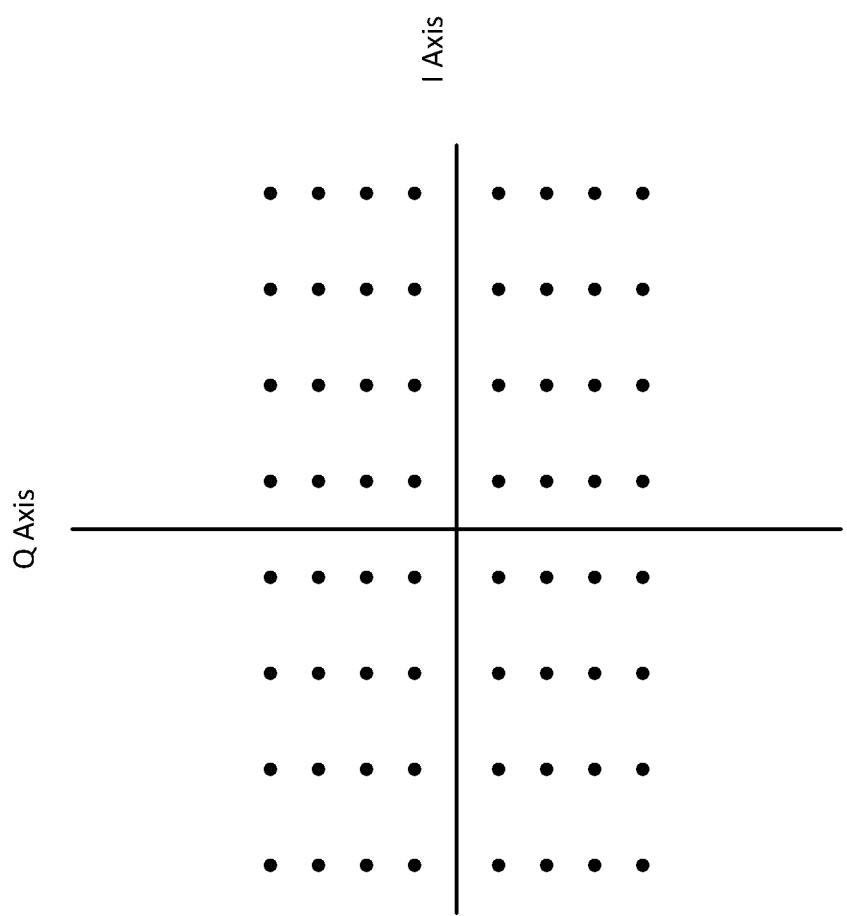

Other defects may include a rotated constellation as shown in FIG. 3. The constellation is rotated by an angle, θ. FIG. 4 shows an example of an offset constellation. FIG. 5 shows a scaling error. The control of the digital-to-analog converters (DACs) in the system, as well as the magnitude of the signals, can correct for these errors.

Figure 6:
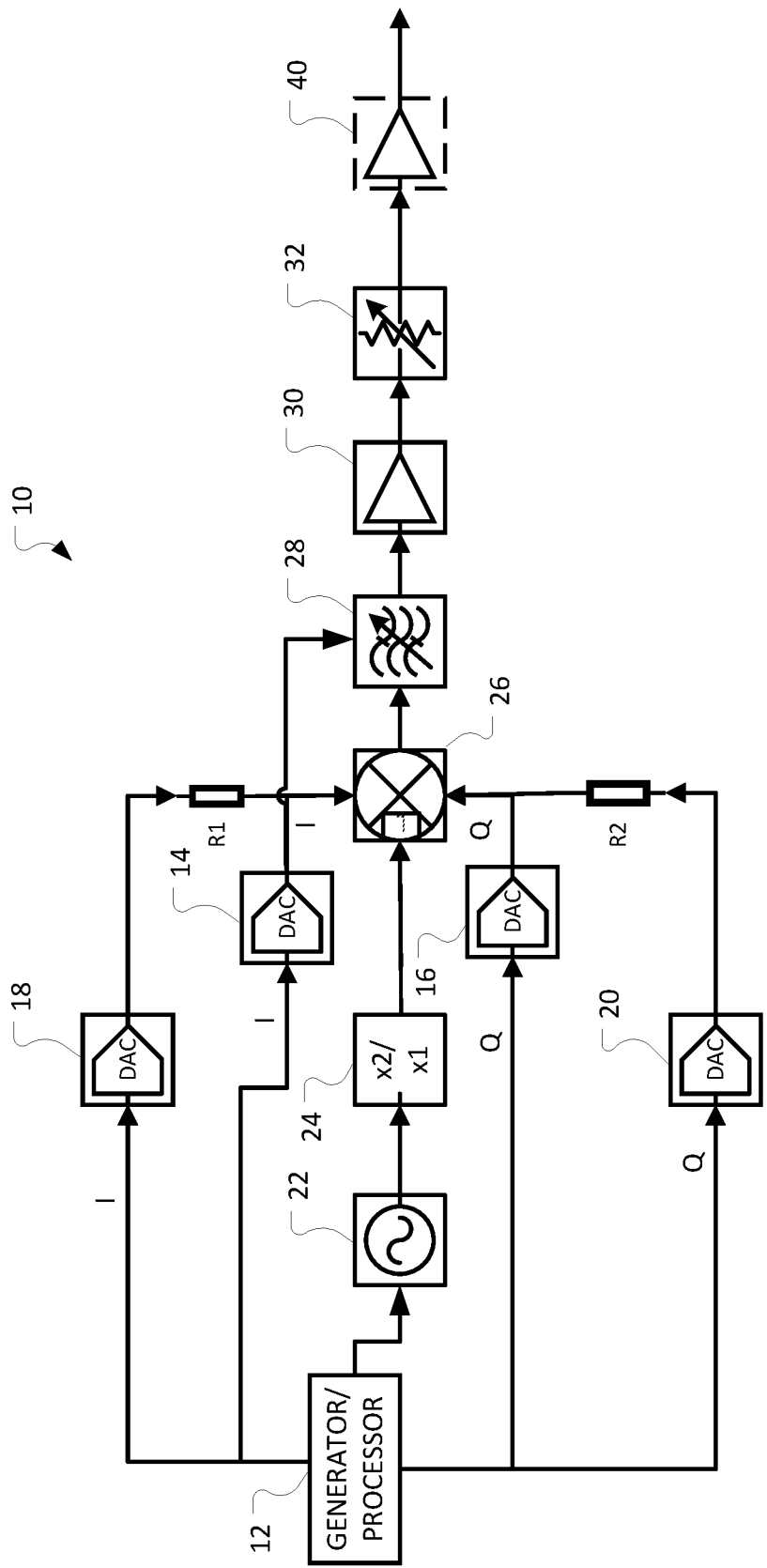
FIG. 6 shows an embodiment of an ultra-wide signal source.

FIG. 6 shows an embodiment of an ultra-wideband signal generator 10. Such as signal generator may have, for example, a bandwidth of 20 GHz, accessing the RF space up to 44 GHz with low or ultra-low phase noise. This ultra-wideband generator can be "built" inside existing equipment, such as arbitrary waveform generators. This signal generator would consume two channels of the AWG, one for I data and one for Q data, and would provide one output.

Signal generator 10 may include one or more processors, represented by processor 12. The signal generator may be included in the design or may represent another circuit that provides the I and Q signals and other control signals to the ultra-wideband generator. Processor 12 represents the I/Q signal generator that produces the digital I and digital Q data for the system. The processor 12 may also represent other system processors, such as general-purpose processors, or digital signal processors, other than the processor that generates the I/Q digital data, although the processor generating the data may also act as the system processor. Similarly, processor 12 may control or otherwise communicate with the local oscillator (LO) 22, such as to provide the system clock, or to send a start signal to the LO 22. The LO 22 acts as the carrier signal generator, discussed in more detail below.

Two or more "main" DACs 14 and 16 may operate on the I/Q digital data to convert them to analog I and Q signals, one main DAC for each. These are referred to as the "main" DACs to differentiate them from the two or more offset DACs 18 and 20, discussed in more detail later. The I and Q analog data goes to a mixer 26, such as an RF (radio frequency) IQ mixer. The mixer 26 mixes the analog I and Q signals with the carrier frequency to provide the output signal for transmission.

The bandpass filter 28 filters the output signal and an amplifier amplifies it. The amplifier 30 may comprise a low noise amplifier (LNA), a body of amplifiers identified by such in the industry. Bandpass filter 28 is variable allowing the filter to be switched in the bands and provides the filtered output signal. The variable attenuator 32 may operate on the resulting filtered output signal to adjust the power, reduce reflections, etc. The filtered output signal could also be optionally amplified by a power amplifier 40. Another possible modification limits the wideband nature of the system. It can be sold as is, or may include software optioned to limit bandwidth, and/or the operating frequency. Export controls or other such limitations may make this desirable. In one embodiment, such limits would be integrated as waveform filters.

Returning to LO 22, it acts as the carrier band generator and produces a carrier signal. One unique aspect of this signal generator lies in its use of one carrier band generator rather than having a carrier band generator for each band. This reduces the noise and increases the switching speed between bands. In one embodiment, the signal generator has three bands, Band0, Band1, and Band2. In one embodiment, Band0 may have a frequency range from 0 Hz (DC) to 11.5 GHz, Band1 from 10.5 to 25 GHz, and Band 2 from 24 to 44 GHz.

Figure 7:
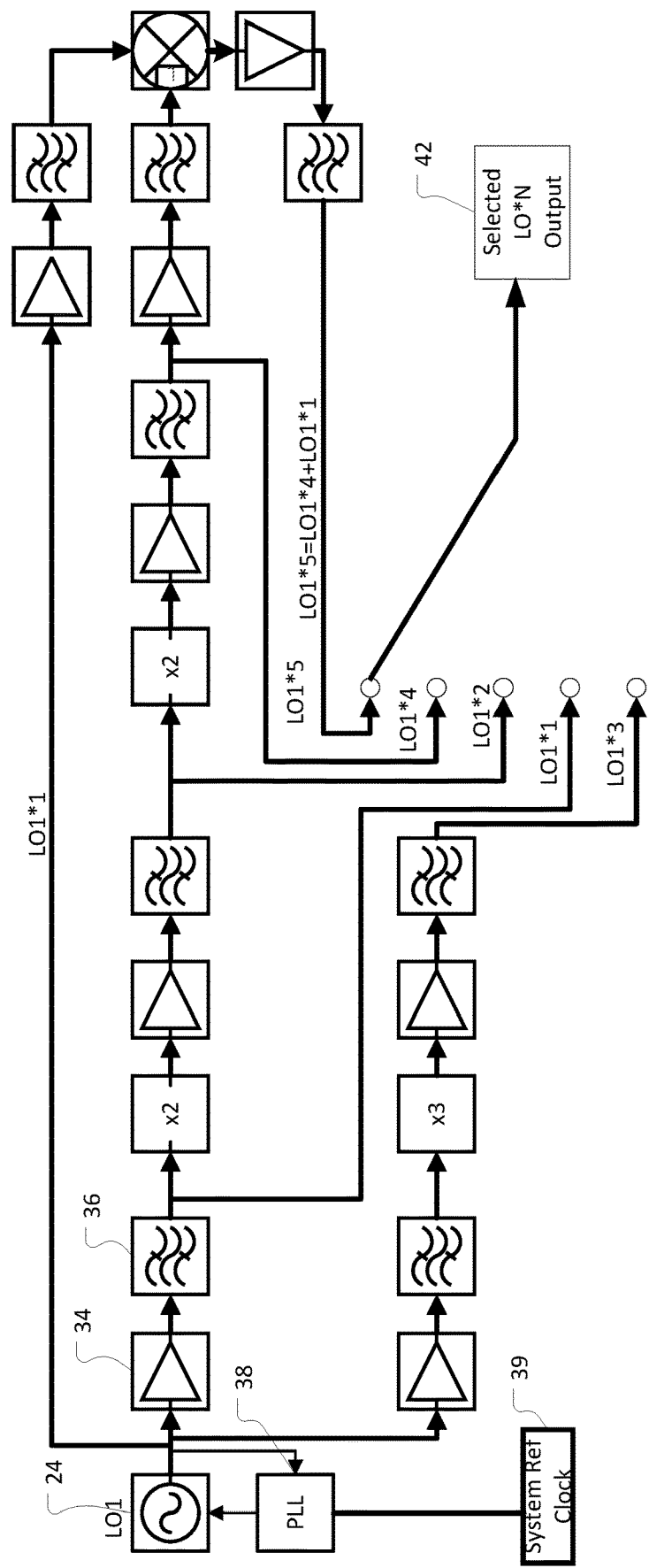
FIG. 7 shows an embodiment of a local oscillator multiplier chain.
Figure 8:
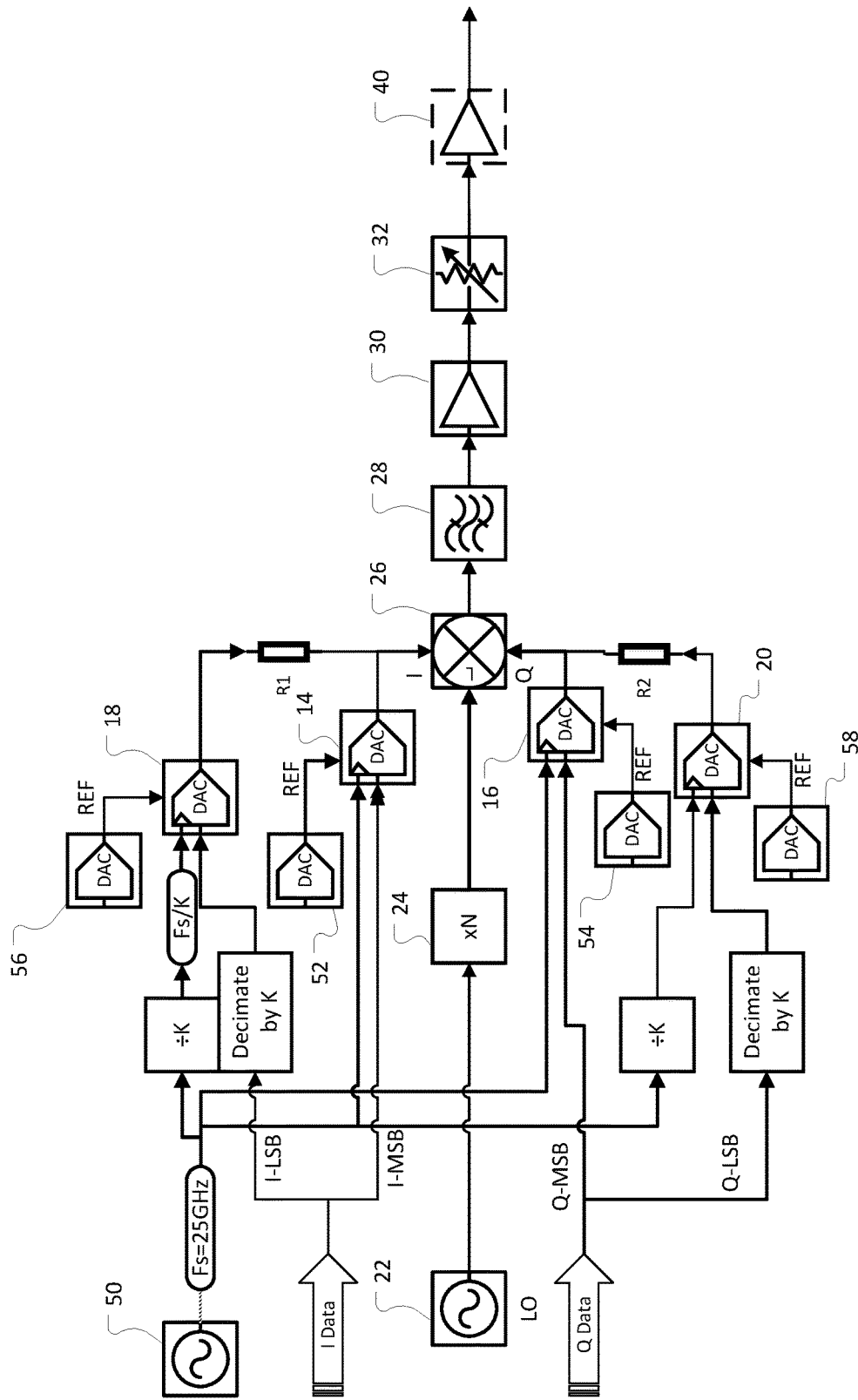
FIG. 8 shows an embodiment of an arrangement of digital-to-analog converters used in an ultra-wide signal source.

FIG. 7 shows an example of a LO multiplier chain to demonstrate how the bands could result from one LO such as 22 from FIG. 6 and FIG. 8, and one or more multipliers, such as 24 from FIGS. 6 and 8. For example, if Fs=25 GHz as the sampling clock for the DAC on I and Q, and a usable passband fraction pbfrac=0.375, then 9.375 GHz (pbfrac*Fs) is available in I and Q. This allows a baseband from either DAC of 9.375 GHz. With an LO=12 GHz, the first band ranges from LO*n−pbfrac*Fs, or 2.625 GHZ, to LO*n+pbfrac*Fs, or 21.375 GHz for n=1. Using the same relationship but a different integer value for the multiplier, the range for n=2, second band ranges from 14.625 to 33.375 GHz. This continues to n=5, with a range of 50.625-69.375 GHz, each band overlapping the previous band by 6.75 GHz. This overlapping structure allows for wide modulation up to this overlap width. While the highest number of the multiplier in this example equals 5, the multiplier may equal higher numbers.

The advantage of a LO1 system using a fundamental frequency, such as 12.5 GHz for example, and then each subsequent band being a simple integer n*LO1 harmonic, is that it allows for low cost, low phase noise harmonic sources, each band being 20*log(n); 6 dB phase noise worse than the other. An oscillator of 12.5 GHz being −130 dBc/Hz at some offset from carrier, would be −124 dBc/Hz (×2), −118 dBc/Hz(×3), −112 dBc(×4), −106 dBc/Hz(×5), allowing 69.375 GHz to be reached at very low phase noise. Filtering and amplification, as shown in the figure maintains proper signal levels and spurious levels. Each next output undergoes amplification and filtering such as shown by amplifier 34 and bandpass filter 36 applied to the LO1*1 signal in FIG. 7. One should note that LO1*n signals have the same frequency for a given value of n but may have differing levels of amplification and/or filtering applied to them.

In one embodiment of a multiplied LO chain, LO1 is fed to a ×2 multiplier, another ×2 multiplier, a ×3 multiplier, or a mixer, or mixer translation (LO1*n+LO1*k) when n is a positive integer and k is a positive or negative integer. This allows production of 5 frequencies, LO1*1, LO1*2, LO1*3, LO1*4, and LO1*5, with a switch such as 42. Such a design process can be followed to produce any desired order of LO1*n frequency, with all intervening products LO1*1, LO1*2, LO1*3, . . . LO1*(n−1), LO1*n, with the desired frequency selected by the switch.

Also switching from stage to stage is very fast, typically in nanosecond, as compared to PLL lock times which are typically in microseconds. In an example embodiment, switching from 9.375 GHz to 69.375 GHz is just the switch time of a solid-state switch which may be less than 1 nanosecond.

In one embodiment, the signal generator may provide Band0 by either routing the data around the frequency multiplier. One may achieve this by shutting off the LO 22 with a DC voltage, or providing a switch, not shown.

The frequencies for Band1 and Band2 come from one LO such as 22 that is fixed. The frequency changes by switching in and out a frequency doubler, which can be switched in nanoseconds. A frequency multiplier can have a "1" setting that results in the carrier frequency for Band1 and uses a factor of "2" to double the frequency. While only two bands using the frequency multiplier 24, other multiples of a base frequency of the LO may be used. Using one LO also provides faster switching time between bands. Typically, switching from any band to any target band takes 15 nanoseconds (nS), including 1 nS hardware settling time.

Using the fixed LO, one can apply ultralow phase noise techniques. These may include −132 dBc/Hz to −124 dBc/Hz at 17 GHz, 10 kHz offset corresponding to −124 dBc/Hz to −118 dBc at 10 kHz offset at 44 GHz. The carrier signal source 22 controls the system phase noise. In one embodiment the carrier signal source comprises a 17 GHz source. Other options for the carrier signal source include using a phase locked loop (PLL) source such as 38, or a dielectric resonator oscillator (DRO). One could also reduce costs by using the existing system clock shown at 39. However, the system clock may have a lower frequency coverage. For example, if the system clock runs at 12.5 GHz, it would reduce the frequency coverage.

Returning to FIG. 6, the offset DACs 18 and 20 may behave as "composite DACs," performing the digital-to-analog conversions from DC (0 Hz) through some designated frequency, such as several hundred kHz. The main DACs would then take over after that. This approach allows for fine, higher bit resolution adjustment. The faster, higher resolution main DACs may perform the conversion in larger 'steps,' while the slower, lower resolution offset DACs fill in with smaller steps between the levels generated by the main DACs.

For example, if the offset DACs are 8-bit DACs, and the main DACs have 10-bit resolution, they would result in 18-bit resolution. Higher resolution provides few errors for carrier feed thru, and I/Q offset as a function of temperature. The I and Q offset DACs adjust for carrier feed thru at the lower levels, with upper/lower sideband isolation performed with gain/balancing of the overall DAC I/Q channels magnitude weighting.

FIG. 8 shows a more detailed diagram of the offset DACs 18 and 20 and main DACs 14 and 16, with the rest of the circuit shown for clarity. The combination of these DACs may provide error correction to the errors mentioned above. In general, imbalances in a mixer and imperfection in the main DACs may lead to all the defects shown in FIGS. 1-5. Correction of these defects can be improved in the data path as well by circuit correction by the offset DAC's.

For gain scaling, shown in FIG. 5, the system can adjust the I and Q reference level, or by magnitude of the DAC signal in the I and Q paths can correct this.

Rotation errors such as those shown in FIG. 3 may be corrected by applying a rotation matrix to I, Q with error θ to corrected values I', Q.'

$$\begin{bmatrix} I' \\ Q' \end{bmatrix} = \begin{bmatrix} \cos(\theta) & -\sin(\theta) \\ \sin(\theta) & \cos(\theta) \end{bmatrix} \times \begin{bmatrix} I \\ Q \end{bmatrix} \quad [1]$$

Translation errors resulting in the offset errors, such as those shown FIG. 4, I and Q may be corrected by adding offsets $I_A$, $Q_A$ to either the data for I, Q, augmented by the offset DACs for I and Q.

$$I'=I+I_\Delta \qquad [2]$$

$$Q'=Q+Q_\Delta \qquad [3]$$

Scale correction for fraction magnitude errors in I and Q, $M_I$, and $M_Q$, may be corrected by applying the following corrections:

$$I'=I^*(1+M_I)/S \qquad [4]$$

$$Q'=Q^*(1+M_Q)/S \qquad [5]$$

where $S=\max((1+M_I+I_\Delta), (1+M_Q+Q_\Delta))$ so that the result of equations [2] and [3] stays within the DAC dynamic range. (−512 to +511 as an example)

In general, two DACs create the scaling for I and Q. In the case where the main DAC covers a certain voltage range, such as −0.5V to 0.5V for example, with resolution such as 10 bits, so the 1 V range is covered with 1024 states, represented by binary number unsigned 0-1023, or signed from −512 to +511, with resolution or space between states of $1/(2^{10}-1)=1/1023\approx0.97752$ mV. The offset DAC of m-bits range may be set by the coupling resistor to cover a range of +1/512 to +1/511. With a resolution of $1/(1023*(2^m-1))$.

I or Q offset errors are generally discovered during calibration. They are observed as an offset in the I and Q test pattern as shown in FIG. 4, and as LO leakage in FIG. 1. One approach uses two signals in sequence, first a test pattern that covers all I and Q values equally in a QAM-N rectangular grid, or by using polar forms. Second, the approach uses a series of tones such that f>0 in one case and f<0 in another case. Image spurious requires a single Euler tone $(\cos 2\pi f + i \sin 2\pi f) = e^{i\,2\pi f}$ where the I channel DAC has data for $Q=\cos(2\pi f)$ and $I=\sin(2\pi f)$. The desired tone will be at $F_{out}=F_{LO+f}$, the image spurious at frequency=$F_{LO}$−f, the LO feed thru at frequency=$F_{LO}$ and the desired signal at frequency=$F_{LO}$+f.

Time-phase shifting on individual I and Q channels will select data points spaced at t=n*1/Fs, where Fs is the sampling rate, and n is the number of sample points to shift. Phase shifting on an individual I and Q channel will be necessary at times when simple global phase shifting is insufficient. In FIG. 8, an example sampling rate is shown 25 GHz at 50.

The process then provides I and Q scaling correction by equations 4 and 5 in the data path and by adjusting the scale magnitude of the DAC by adjusting the DAC range. The process then applies rotation, using the vector rotation matrix of equation 1 and the rectangular grid so that the angle of the square is approximately 0 degrees for horizontal I and Q points, and 90 degrees for vertical points. One then corrects the DC offset in I and Q and by the carrier feed thru equations 2 and 3.

Optimization of one to three runs is often necessary. Each run improves on the estimates for $I_\Delta$, $Q_\Delta$, $M_I$, $M_Q$, S for minimum I offset, Q offset, LO feedthrough and minimal image spurious. The use of the offset DACs in the system allows for this process to correct errors in the data. The offset DACs receive a slower sampling clock. The local oscillator 50 may provide a signal with the same output frequency as LO 22, but that is then decimated by a factor K. K provides the ratio between the two signals used by the main DACs and the offset DACs. For example, if the main DACs receive a signal of 25 GHz, and K is 100, the signal for the offset DACs is at 250 MHz.

Regarding the offset and main DACs, one can employ them in different ways. In a first embodiment, main I DAC 14 and the offset I DAC 18 are held static at the offset value required for best performance, determined by the offset, carrier/LO feedthrough and image spurious. In another embodiment, the I Data path is handled in two data streams creating a composite stream of extended precision. In this extended precision embodiment, the scaling of the offset DAC is adjusted so that it just fills in the resolution steps of the main DAC. Scaling of the main DAC is accomplished through a DAC controlled DC reference to the DAC at 52 and 54, and the offset DAC scale is controlled by two values, the reference DAC adjusts at 56 and 58, and the resistor R1, relative to the Thevenin impedance of the I DAC 14 and the impedance of the mixer 26 I port. The reference DACs 52, 56, 54 and 58 set the magnitude of the other DACs, they do not actually operate on the I and Q signals.

The above embodiments provide several advantages. For example, the ratio of wide band DAC to LO allows an overlapping, controlled bandwidth. The single frequency/harmonic generator allows for low phase noise. In one example, one can a 15 GHz LO frequency and use harmonics at 30, 45, 60 GHz, etc. A single frequency can have low phase noise, making it 20-50 dB quieter than a general-purpose wideband signal source. Multipliers provide flexibility, such as selecting ×1, ×2, ×3, ×4, ×5, etc., which includes filtering and amplification at low complexity. They can be switched at high speed from one to another.

Further advantages include that the LO/carrier signal generator and the system clock can be common integral numbers, such as 3 GHz*8=24 GHz clock, and 3 GHz*5=15 GHz LO. The common core LO allows easier multi-unit synchronization and has lower costs as the common core can be shared. As mentioned above, the common LO allows for faster switch time, and switching is through switching of multipliers, not requiring PLL settling time. The complex generator allows for a wideband carrier with image suppression. The complex generator has extended resolution with lower residual IRR (image rejection ratio) calculation. The two LOs, 22 and 50, shown in FIG. 8 may be tied together, or may function independently.

Aspects of the disclosure may operate on particularly created hardware, on firmware, digital signal processors, or on a specially programmed general-purpose computer including a processor operating according to programmed instructions. The terms controller or processor as used herein are intended to include microprocessors, microcomputers, Application Specific Integrated Circuits (ASICs), and dedicated hardware controllers. One or more aspects of the disclosure may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device. The computer executable instructions may be stored on a non-transitory computer readable medium such as a hard disk, optical disk, removable storage media, solid state memory, Random Access Memory (RAM), etc. As will be appreciated by one of skill in the art, the functionality of the program modules may be combined or distributed as desired in various aspects. In addition, the functionality may be embodied in whole or in part in firmware or hardware equivalents such as integrated circuits, FPGA, and the like. Particular data structures may be used to more effectively implement one or more aspects of the disclosure, and such data structures are contemplated within the scope of computer executable instructions and computer-usable data described herein.

The disclosed aspects may be implemented, in some cases, in hardware, firmware, software, or any combination thereof. The disclosed aspects may also be implemented as instructions carried by or stored on one or more or non-transitory computer-readable media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Computer storage media means any medium that can be used to store computer-readable information. By way of example, and not limitation, computer storage media may include RAM, ROM, Electrically Erasable Programmable Read-Only Memory (EEPROM), flash memory or other memory technology, Compact Disc Read Only Memory (CD-ROM), Digital Video Disc (DVD), or other optical disk storage, magnetic cassettes, magnetic tape, magnetic disk storage or other magnetic storage devices, and any other volatile or nonvolatile, removable or non-removable media implemented in any technology. Computer storage media excludes signals per se and transitory forms of signal transmission.

Communication media means any media that can be used for the communication of computer-readable information. By way of example, and not limitation, communication media may include coaxial cables, fiber-optic cables, air, or any other media suitable for the communication of electrical, optical, Radio Frequency (RF), infrared, acoustic or other types of signals.

EXAMPLES

Illustrative examples of the disclosed technologies are provided below. An embodiment of the technologies may include one or more, and any combination of, the examples described below.

Example 1 a waveform generator, comprising: a carrier band generator configured to produce a carrier signal; one or more selectable frequency multipliers to receive the carrier signal and to output a selected carrier signal having a frequency of a multiple of the carrier signal; at least two main digital-to-analog converters (DACs), each main DAC to receive one of a digital in-phase (I) signal and a digital quadrature (Q) signal and to convert the digital I signal and digital Q signal to an analog I signal and an analog Q signal in accordance with a control signal; at least two offset DACs, each offset DAC to receive one of the digital I signal and the digital Q signal to convert the digital I signal and the digital Q signal to an analog I signal and an analog Q signal in accordance with the control signal; a mixer to mix the analog I signal and the analog Q signal with the selected carrier signal to produce an output signal; and a variable filter configured to receive the output signal and produce a filtered output signal.

Example 2 is the waveform generator of Example 1, further comprising a power amplifier to receive the filtered output signal.

Example 3 is the waveform generator of either of Examples 1 or 2, further comprising a bandpass filter between the mixer and the variable filter.

Example 4 is the waveform generator of any of Examples 1 through 3, further comprising one or more processors configured to execute code that causes the one or more processors to: generate the digital I signal and the digital Q signal; send the control signal to the at least two main DACs and the at least two offset DACs to designate whether the main DACs or the offset DACs are to receive the digital I signal and digital Q signal; and send a selection signal to the frequency multiplier to select the frequency of the selected carrier signal.

Example 5 is the waveform generator of Example 3, wherein the code that causes the one or more processor to send control signals causes the one or more processors to send controls signals to the at least two offset DACs to cause the at least two offset DACs to operate on the digital I signal and digital Q signal at a first set of frequencies from DC to a designated frequency.

Example 6 is the waveform generator of Example 3, wherein the code that causes the one or more processor to send control signals cause the one or more processors to send controls signals to the at least two main DACs to cause the at least two main DACs to operate on the digital I signal and digital Q signal at a second set of frequencies higher than a designated frequency.

Example 7 is the waveform generator of any of Examples 1 through 6, wherein the variable filter is configured to receive a signal that designates a band for the variable filter based upon the band in which the signal operates.

Example 8 is the waveform generator of any of Examples 1 through 7, wherein at least one of the mixer and the offset DACs are configured to correct errors in the signal.

Example 9 is the waveform generator of Example 8, wherein the errors at least one of frequency domain artifacts, rotation errors, offset errors, and scaling errors.

Example 10 is the waveform generator of any of Examples 1 through 9, wherein the carrier band generator comprises one of an RF synthesizer, a dielectric resonator oscillator, and a phase-locked loop.

Example 11 is the waveform generator of any of Examples 1 through 10, wherein the waveform generator is configured to control an output bandwidth to remain within a particular band.

Example 12 is the waveform generator of any of Examples 1 through 11, wherein the carrier band generator comprises a local oscillator, and the one or more frequency multipliers for a multiplied local oscillator chain with overlapping frequencies.

Example 13 is a method of generating waveforms, comprising: generating an in-phase (I) digital signal and a quadrature (Q) digital signal; generating a carrier band signal; using a multiplier to receive the carrier band signal and output a selected carrier signal having a frequency of a multiple of the carrier signal; converting the I digital signal and the Q digital signal to an I analog signal and an Q analog signal; mixing the I analog signal, the Q analog signal, and the selected carrier signal to product an output signal; and filtering the output signal to produce a filtered output signal.

Example 14 is the method of Example 13, wherein converting the I digital signal and the Q digital signal comprises using two or more main digital-to-analog converters (DAC) and two or more offset DACs to perform the converting.

Example 15 is the method of Example 14, wherein using two or main DACs and two or more offset DACs comprises using the two or more offset DACs to perform the converting for the I signal and the Q signal for frequencies between DC and a designated frequency.

Example 16 is the method of Example 14, wherein using two or more main DACs and two or more offset DACs comprises using the two or more main DACs to perform the converting for the I signal and the Q signal for frequencies higher than a designated frequency.

Example 17 is the method of any of Examples 13 through 16, further comprising correcting errors in at least one of the mixer and the at least two offset DACs.

Example 18 is the method of Example 17, wherein correcting errors comprises at least one of correcting gain scaling errors by adjusting one of either a reference level for the I and Q digital signals, adjusting a magnitude of the I and Q analog signals, and correcting rotation errors by applying a correction matrix to the I and Q signals.

Example 19 is the method of Example 17, wherein correcting errors comprises correcting fraction magnitude errors by adjusting the I signal and the Q signal by multiplying the I signal and the Q signal having the error by one plus the fraction magnitude error, divided by a maximum.

Example 20 is the method of Example 17, wherein correcting the errors comprises correction offset errors by adding offsets to the I digital signal and the Q digital signal using data from the at least two offset DACs.

Additionally, this written description makes reference to particular features. It is to be understood that the disclosure in this specification includes all possible combinations of those particular features. Where a particular feature is disclosed in the context of a particular aspect or example, that feature can also be used, to the extent possible, in the context of other aspects and examples.

Also, when reference is made in this application to a method having two or more defined steps or operations, the defined steps or operations can be carried out in any order or simultaneously, unless the context excludes those possibilities.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Although specific examples of the invention have been illustrated and described for purposes of illustration, it will be understood that various modifications may be made without departing from the spirit and scope of the invention. Accordingly, the invention should not be limited except as by the appended claims.

The invention claimed is:

1. A waveform generator, comprising:
    a carrier band generator configured to produce a carrier signal;
    one or more selectable frequency multipliers to receive the carrier signal and to output a selected carrier signal having a frequency of a multiple of the carrier signal;
    at least two main digital-to-analog converters (DACs), each main DAC to receive one of a digital in-phase (I) signal and a digital quadrature (Q) signal and to convert the digital I signal and digital Q signal to a first analog I signal and a first analog Q signal in accordance with a control signal;
    at least two offset DACs, each offset DAC to receive one of the digital I signal and the digital Q signal to convert the digital I signal and the digital Q signal to a second analog I signal and a second analog Q signal in accordance with the control signal;
    a mixer to mix the first analog I signal, the second analog I signal, the first analog Q signal, and the second analog Q signal with the selected carrier signal to produce an output signal; and
    a variable filter configured to receive the output signal and produce a filtered output signal.

2. The waveform generator as claimed in claim 1, further comprising a power amplifier to receive the filtered output signal.

3. The waveform generator as claimed in claim 1, further comprising a bandpass filter between the mixer and the variable filter.

4. The waveform generator as claimed in claim 1, further comprising one or more processors configured to execute code that causes the one or more processors to:
    generate the digital I signal and the digital Q signal;
    send the control signal to the at least two main DACs and the at least two offset DACs to designate whether the main DACs or the offset DACs are to receive the digital I signal and digital Q signal; and
    send a selection signal to the one or more selectable frequency multiplier to select the frequency of the selected carrier signal.

5. The waveform generator as claimed in claim 4, wherein the code that causes the one or more processors to send control signals causes the one or more processors to send controls signals to the at least two offset DACs to cause the at least two offset DACs to operate on the digital I signal and digital Q signal at a first set of frequencies from DC to a designated frequency.

6. The waveform generator as claimed in claim 4, wherein the code that causes the one or more processors to send control signals cause the one or more processors to send controls signals to the at least two main DACs to cause the at least two main DACs to operate on the digital I signal and digital Q signal at a second set of frequencies higher than a designated frequency.

7. The waveform generator as claimed in claim 1, wherein the variable filter is configured to receive a signal that designates a band for the variable filter based upon the band in which the signal operates.

8. The waveform generator as claimed in claim 1, wherein at least one of the mixer and the at least two offset DACs are configured to correct errors.

9. The waveform generator as claimed in claim 8, wherein the errors comprises at least one of frequency domain artifacts, rotation errors, offset errors, and scaling errors.

10. The waveform generator as claimed in claim 1, wherein the carrier band generator comprises one of an RF synthesizer, a dielectric resonator oscillator, and a phase-locked loop.

11. The waveform generator as claimed in claim 1, wherein the waveform generator is configured to control an output bandwidth to remain within a particular band.

12. The waveform generator as claimed in claim 1 wherein the carrier band generator comprises a local oscillator, and the one or more selectable frequency multipliers for a multiplied local oscillator chain with overlapping frequencies.

13. A method of generating waveforms, comprising:
    generating an in-phase (I) digital signal and a quadrature (Q) digital signal;
    generating a carrier band signal;
    using a multiplier to receive the carrier band signal and output a selected carrier signal having a frequency of a multiple of the carrier band signal;
    converting the I digital signal and the Q digital signal to a first and a second I analog signal and a first and a second Q analog signal in accordance with a control signal;

mixing the first and the second I analog signal, the first and the second Q analog signal, and the selected carrier signal to product an output signal; and filtering the output signal to produce a filtered output signal.

14. The method as claimed in claim 13, wherein converting the I digital signal and the Q digital signal comprises using two or more main digital-to-analog converters (DAC) and two or more offset DACs to perform the converting.

15. The method as claimed in claim 14, wherein using two or main DACs and two or more offset DACs comprises using the two or more offset DACs to perform the converting for the I digital signal and the Q digital signal for frequencies between DC and a designated frequency.

16. The method as claimed in claim 14, wherein using two or more main DACs and two or more offset DACs comprises using the two or more main DACs to perform the converting for the I digital signal and the Q digital signal for frequencies higher than a designated frequency.

17. The method as claimed in claim 15, further comprising correcting errors in at least one of a mixer and the two or more offset DACs.

18. The method as claimed in claim 17, wherein correcting errors comprises at least one of correcting gain scaling errors by adjusting one of either a reference level for the I and Q digital signals, adjusting a magnitude of at least one of the first and the second I and Q analog signals, and correcting rotation errors by applying a correction matrix to the I and Q digital signals.

19. The method as claimed in claim 17, wherein correcting errors comprises correcting fraction magnitude errors by adjusting the I digital signal and the Q digital signal by multiplying the I digital signal and the Q digital signal having a respective error by one plus a respective fraction magnitude error, divided by a maximum.

20. The method as claimed in claim 17, wherein correcting the errors comprises correction offset errors by adding offsets to the I digital signal and the Q digital signal using data from the two or more offset DACs.

* * * * *